(12) United States Patent
Pelletier et al.

(10) Patent No.: US 10,059,383 B2
(45) Date of Patent: Aug. 28, 2018

(54) MOTOR COACHES FOR THE MOBILITY IMPAIRED

(71) Applicant: Motor Coach Industries Limited, Winnipeg (CA)

(72) Inventors: John-Paul Pelletier, Winnipeg (CA); Paul Fazio, Oak Bank (CA)

(73) Assignee: Motor Coach Industries Limited, Winnipeg (CA)

( * ) Notice: Subject to any disclaimer, the term of this patent is extended or adjusted under 35 U.S.C. 154(b) by 9 days.

(21) Appl. No.: 15/217,611

(22) Filed: Jul. 22, 2016

(65) Prior Publication Data

US 2017/0240214 A1    Aug. 24, 2017

Related U.S. Application Data

(60) Provisional application No. 62/297,474, filed on Feb. 19, 2016.

(51) Int. Cl.
   *B62D 31/02*    (2006.01)
   *A61G 3/08*     (2006.01)
   *A61G 3/06*     (2006.01)

(52) U.S. Cl.
   CPC ............ *B62D 31/02* (2013.01); *A61G 3/061* (2013.01); *A61G 3/0808* (2013.01)

(58) Field of Classification Search
   CPC ....... B62D 31/02; A61G 3/061; A61G 3/0808
   (Continued)

(56) References Cited

U.S. PATENT DOCUMENTS

| 1,508,178 A | 9/1924 | Gage |
| 1,596,212 A | 8/1926 | Newell |

(Continued)

FOREIGN PATENT DOCUMENTS

| CA | 2652352 A1 | 8/2009 |
| DE | 3738302 A1 | 7/1988 |

(Continued)

OTHER PUBLICATIONS

May 23, 2017—(WO) Partial International Search Report—App. PCT/US2017/018510.

(Continued)

*Primary Examiner* — Joseph D. Pape
(74) *Attorney, Agent, or Firm* — Banner & Witcoff, Ltd.

(57) ABSTRACT

A motor coach comprises a front door, a front stairwell, an upper aisleway, upper seats, a side door and a mobility impaired area. The front stairwell leads from the front door. The upper aisleway leads from the front stairwell. The upper aisleway is generally at the level of the top of the upper stairwell. The upper seats are along the upper aisleway. The side door may be lower than or at the same height as the front door, and leads to the mobility impaired area, which is inside and generally at the level of the bottom of the side door. The upper aisleway, upper seats, and mobility impaired area are all together in one unified passenger compartment while separated by differences of location of doors for loading and heights of floors. Numerous advantages flow, including but not limited to the following: loading and unloading times for mobility impaired passengers are substantially improved, especially as compared to typical high floor, wheelchair lift equipped coaches.

22 Claims, 8 Drawing Sheets

(58) Field of Classification Search
USPC .......................................................... 296/178
See application file for complete search history.

(56) References Cited

U.S. PATENT DOCUMENTS

| | | | |
|---|---|---|---|
| 1,654,492 A | | 12/1927 | Corbin, Jr. |
| 1,905,842 A | | 4/1933 | Forrester |
| 2,405,136 A | | 8/1946 | Dittrich |
| D161,488 S | | 1/1951 | Meldrum |
| D169,855 S | | 6/1953 | Kay |
| D173,653 S | | 12/1954 | Gigardy |
| 2,822,055 A | | 2/1958 | Ludowici |
| D189,745 S | | 2/1961 | Ahrens |
| 3,971,455 A | | 7/1976 | Molzon |
| 4,071,152 A | | 1/1978 | Kinkead et al. |
| 4,131,209 A | | 12/1978 | Manning |
| 4,339,224 A | | 7/1982 | Lamb |
| 4,457,554 A | | 7/1984 | Fuisz et al. |
| 4,666,204 A | * | 5/1987 | Reinholtz ............. B60P 3/0257 296/178 |
| 4,688,843 A | * | 8/1987 | Hall .................... A61G 3/0808 248/503.1 |
| 4,690,364 A | | 9/1987 | Constantin |
| 4,759,682 A | | 7/1988 | Hood |
| 4,964,671 A | | 10/1990 | Millar |
| 5,197,774 A | | 3/1993 | Diaz |
| 5,259,081 A | | 11/1993 | Henderson |
| 5,577,793 A | | 11/1996 | Kobasic |
| 5,636,399 A | | 6/1997 | Tremblay et al. |
| 5,651,579 A | | 7/1997 | Krieger |
| 5,967,583 A | | 10/1999 | Wishart |
| 6,113,325 A | | 9/2000 | Craft |
| 6,126,218 A | | 10/2000 | Karhumaki |
| 6,179,545 B1 | | 1/2001 | Petersen, Jr. et al. |
| 6,238,168 B1 | | 5/2001 | Cohn et al. |
| 6,390,537 B1 | * | 5/2002 | DiGonis ................ B62D 21/14 29/401.1 |
| 7,040,847 B1 | | 5/2006 | Cardona |
| 7,717,655 B2 | | 5/2010 | Cardona |
| 7,802,801 B2 | | 9/2010 | Bartel et al. |
| D628,133 S | | 11/2010 | Counts |
| 7,963,730 B2 | | 6/2011 | Ditch et al. |
| 8,156,595 B2 | | 4/2012 | Budd et al. |
| 8,284,327 B2 | | 10/2012 | Counts |
| 8,651,782 B2 | | 2/2014 | Van Roosmalen et al. |
| 8,911,188 B1 | | 12/2014 | Mill |
| 8,911,196 B2 | | 12/2014 | Cazes |
| 8,926,254 B2 | | 1/2015 | Pocobello et al. |
| 9,061,655 B2 | | 6/2015 | Verachtert |
| 2001/0038787 A1 | | 11/2001 | Beck et al. |
| 2002/0136623 A1 | | 9/2002 | Bauers |
| 2003/0132049 A1 | | 7/2003 | Kurttila et al. |
| 2003/0215316 A1 | | 11/2003 | Burney et al. |
| 2009/0087278 A1 | | 4/2009 | Girardin et al. |
| 2009/0224570 A1 | | 9/2009 | Haswell et al. |
| 2014/0219756 A1 | | 8/2014 | Smith et al. |
| 2014/0334893 A1 | | 11/2014 | Goss et al. |
| 2014/0356090 A1 | | 12/2014 | Cardona |
| 2014/0369778 A1 | | 12/2014 | Hermanson et al. |
| 2015/0097363 A1 | | 4/2015 | Bell et al. |
| 2015/0164716 A1 | | 6/2015 | Kilduff et al. |

FOREIGN PATENT DOCUMENTS

| | | | |
|---|---|---|---|
| DE | 4131902 A1 | * | 4/1993 |
| GB | 2417021 A | | 2/2006 |
| WO | 0230704 A1 | | 4/2002 |
| WO | 03002397 A1 | | 1/2003 |
| WO | 2006079768 A1 | | 8/2006 |

OTHER PUBLICATIONS

Aug. 7, 2017—(WO) International Search Report and Written Opinion.

* cited by examiner

MOTOR COACHES FOR THE MOBILITY IMPAIRED

CROSS REFERENCE TO RELATED APPLICATIONS

This patent application claims the benefit of U.S. Provisional Patent Application No. 62/297,474 filed Feb. 19, 2016, the content of which is incorporated herein by reference.

FIELD OF THE INVENTION

This patent relates to motor coaches, the layouts of such coaches to benefit the mobility impaired, and mechanisms of securement of the vehicles of the impaired.

BACKGROUND

Coach Layouts

Common double decker buses have seating on an upper level, can have one or more stairwells, can have two doors, and can have open space on a lower level. Examples are provided in U.S. Pat. No. 1,905,842 and U.S. Patent Publication 2009/0224570.

Other related examples include, for example, European Patent Application EP 2 340 798 which discloses a space in a coach set aside for the mobility impaired. The coach has a typical layout of a central aisle and pairs of seats. The space is provided by removing several pairs of seats along one side of the aisle. FIG. 6 looks down from overhead at the set-aside space. A wheelchair is present. Four belts—marked by numbers 40, 40', 70, 70'—hold the wheelchair. They are secured to the coach inside boxes below the floor of the coach. They are fastened to the chair by hooks—42, 42', 72, 72'. A seatbelt—50, 50'—is also provided. Winding mechanisms are included and provide for retracting and extending the belts. A shoulder belt may be added.

U.S. Design Pat. D62813351 discloses a coach interior. As in FIGS. 1 and 2 of the patent, the design of Design Pat. D62813351 is a side-facing stadium-seating layout of passenger seats. Three rows of seats all face to one side of the coach. Each row that sits behind another row is elevated for passenger viewing above the heads of the passengers in the row ahead. U.S. Pat. No. 4,964,671 also has stadium seating, this time oriented toward the front, rather than sideways. It also includes a movie screen at the front, as in FIG. 1.

U.S. Pat. No. 5,967,583 discloses an RV. As in FIGS. 1 and 2 of the patent, an RV has at least three levels. They are for living space. The lower level includes a "walking portion." The upper level is a deck.

U.S. Pat. No. 5,197,774 discloses a motor coach with a broadcast booth and a separate office. As shown in FIGS. 1 and 2, the coach includes two levels. A driver's area is on the lower level. A stairway leads to the upper level. The stairway is in the middle of the coach. The upper level includes two compartments. Furnishings on the coach include a desk and a cabinet for electronic equipment in each compartment.

U.S. Pat. No. 2,405,136 discloses a double deck vehicle, a Pullman train car. FIGS. 1 and 2 are the two ends of the car. Seats in the center are on two levels. Upper seats include a central aisle. Lower seats are turned outward and include side aisles. Side stairwells lead from the lower seating level aisles to a middle, non-seating, service level at either end. A central stairwell leads to the central aisle of the upper seating level.

Canadian Patent 2,652,352 discloses a coach with seating that varies in floor level, one level in the front, and another in the back. The two levels are joined by a step.

Securement for Wheelchairs and Wheelchair Ramps

U.S. Pat. No. 7,963,730 discloses in its background a disfavored tie-down system of straps with hooks to engage wheelchair frames and lugs to engage floor receptors. It asserts advantages of greater safety, reduced delays, lack of need for dedicated floor space, and occupancy of mobility-impaired space by the able-bodied as appropriate. The tie-down is adjacent folding chairs.

U.S. Pat. No. 7,717,655 discloses a set of wheelchair securement mechanisms. A module at the back has two retractor assemblies with belts. Another belt is at the front. The back belt spools are latchable and otherwise rotating. A control operates the latching. It may be operated by the driver and have a time delay.

U.S. Pat. No. 5,259,081 discloses a two part wheelchair ramp and a wheelchair securement system. As in FIG. 1, the ramp in its two sections may extend out diagonally, or be stowed with the two sections upright and tight against each other. As in FIG. 5, the securement includes upright posts and locking members.

BRIEF SUMMARY OF THE INVENTION

A coach design concept includes a private space for mobility-impaired passengers. This space is out of the main traffic flow of other passengers. It is at a lower level that may be closely adjacent the roadways under the coach. The lower level may be accessed from the coach exterior through a door that is also out of the main traffic flow, and also accessed through a ramp, such as a flip ramp, at this door. The ramp, or flip ramp, may assist in achieving the low level of the floor. The private space may be accessed from the coach interior through a second stair or step well also out of the main traffic flow. The second stair or step well may be located at the rear of the private space. The space has capacity for two wheelchairs, and in their absence, may provide a number of fold-down seats including, for example, five seats for either mobility challenged passengers or companions of mobility impaired passengers. The configuration of the coach includes single seats where needed to accommodate an offset of a central aisle adjacent the mobility-impaired private area. Securement for wheelchairs is optional, and, may be automatic. The configuration of the coach in some aspects is typical, with a standard front entry, high driver's area, central main aisle, and seating in pairs off the main aisle.

Objects of the concept may include the following: significantly reducing loading and unloading times for mobility impaired passengers, especially those in wheelchairs, as compared to motor coaches that include typical elevated seats and an aisle with a stairwell to the aisle and seats; significantly reducing loading and unloading times of all other passengers in the presence of loading for mobility impaired passengers; diminishing the attention the mobility impaired passengers receive from other passengers when loading and unloading; in more detail, eliminating the blocking of stairwells, aisles, corridors and the like, eliminating lights flashing and buzzers blaring; and securing to mobility impaired passengers respect for their personal effects including their vehicles, with wheelchairs being considered a form of vehicle; eliminating cramping, getting hit with bags, and similar and other intrusions into personal spaces of mobility impaired passengers; eliminating conflicts between mobile passengers who have assumed seats in mobility-reserved spaces and mobility impaired passengers in need of such spaces; eliminating difficult maneuvering on and off vehicles and concomitant stress; avoiding significant driver interaction for cumbersome securement; preserving high capacity seating in forward facing seats; preserving passenger comfort in seats, ride quality and amenities; preserving high passenger and driver floors; eliminating non-level loading for mobility impaired passengers through mechanisms such as vertical lifts; minimizing loss of storage; preventing motion sickness due to seats facing directions other than forward; garnering support from the user community; and preserving high MDBF and reliability.

BRIEF DESCRIPTION OF THE DRAWINGS

The drawings accompanying this description include eight figures. The figures are briefly described as follows.

DETAILED DESCRIPTION OF THE INVENTION

Figure 1:
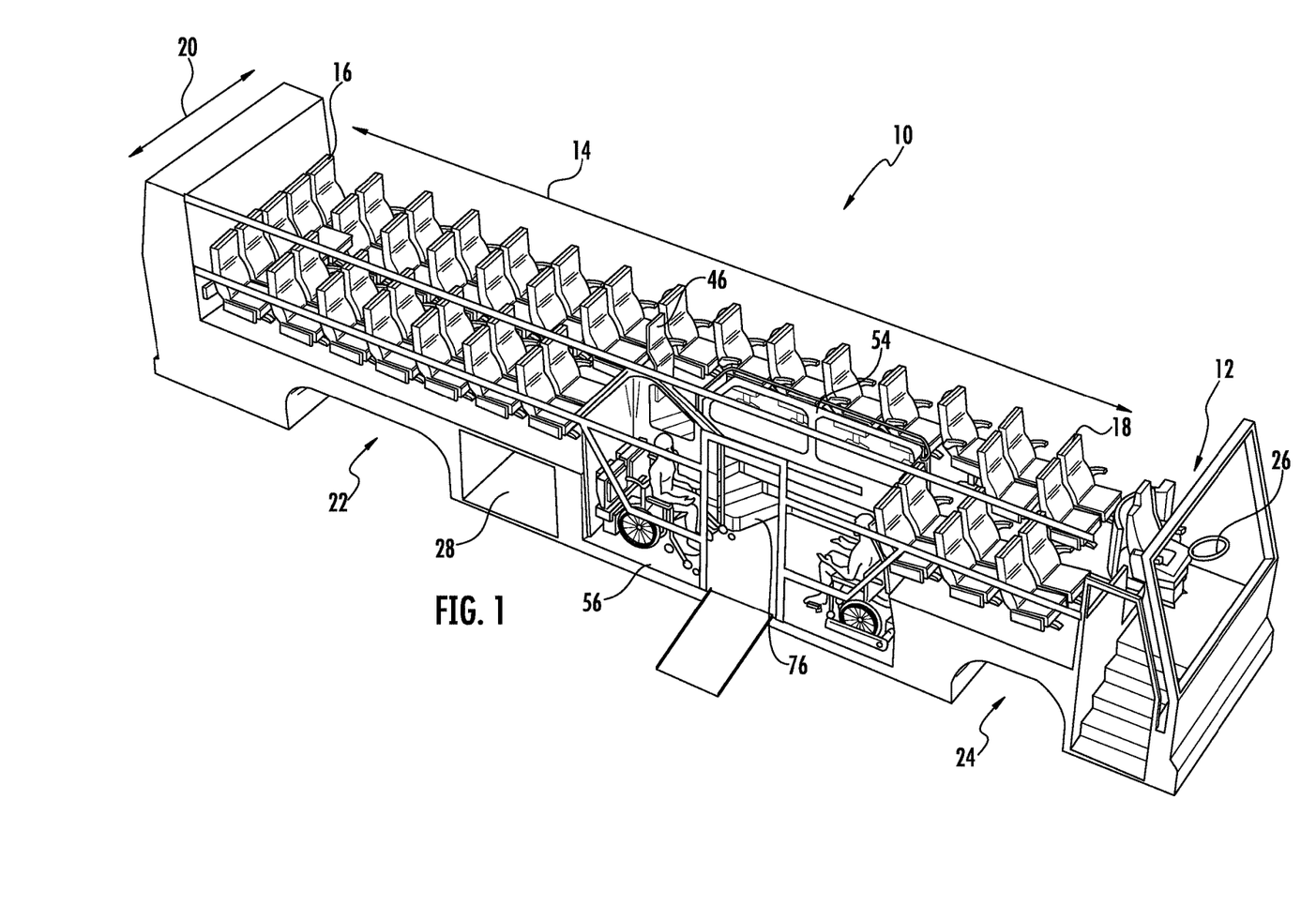
FIG. 1 is a perspective view of relevant portions of an embodiment of a motor coach of the disclosure, with the driver area of the coach to the right, the rear of the coach to the left, wheel well spaces along the lower portions of the coach body, and portions of the coach removed to show interior detail.

Referring to FIG. 1, FIG. 1 is as stated briefly above, a perspective view of relevant portions of the preferred motor coach 10 of the invention. A driver area 12 of the coach 10 is to the right in this orientation of the coach 10 in FIG. 1. A passenger area extends along the longitudinal forward-to-backward direction of the coach behind the driver area 12, the direction and longitudinal extent of the area being represented by double-ended arrow 14. Thus, passenger seats extend from the front row of coach passenger seats 18 to the rear row of coach passenger seats 16. The seats exist in distinct groups of seats, to be explained in greater detail below. The seats also extend across the transverse side-to-side direction of the coach, with direction and extent represented by arrow 20. The rear of the coach is to the left in this orientation.

Wheel well spaces 22, 24 are along the lower portions of the coach body. The roof of the coach 10 is removed to show interior detail. As would be anticipated, the coach is completed by a chassis, an engine, drive train including transmission and axles, and wheels, all not shown, operator controls such as the steering wheel 26, a storage bay 28 with door, not shown, safety equipment such as a wheel end detection system patented in U.S. Pat. No. 8,594,900, issued to Motor Coach Industries Ltd. In 2013, incorporated in full by reference, emission control equipment, windshield, windows, air conditioning and heating, brakes, lights, carpeting, and all other accoutrements of the most modern and best of coaches, all not shown.

Figure 2:
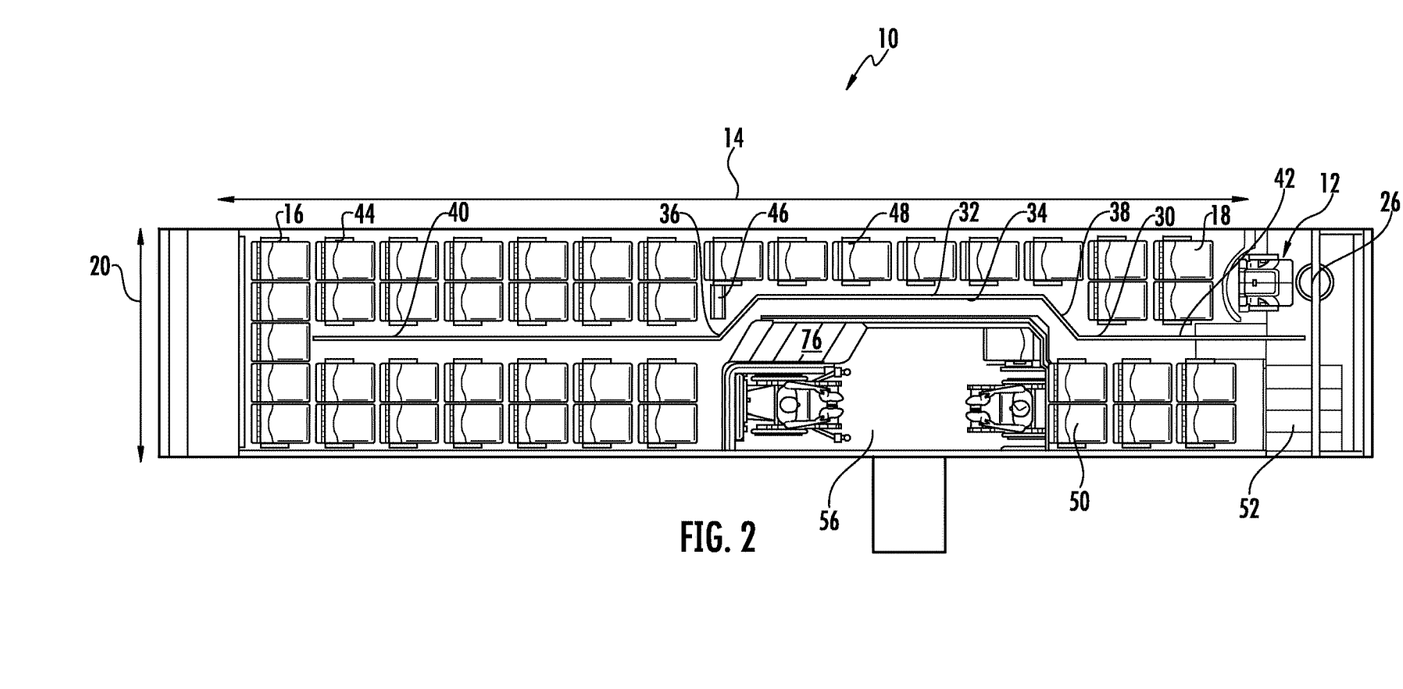
FIG. 2 is a top plan view of the preferred motor coach of this disclosure, again with the roof removed, taken along line 2-2 of FIG. 3.
Figure 3:
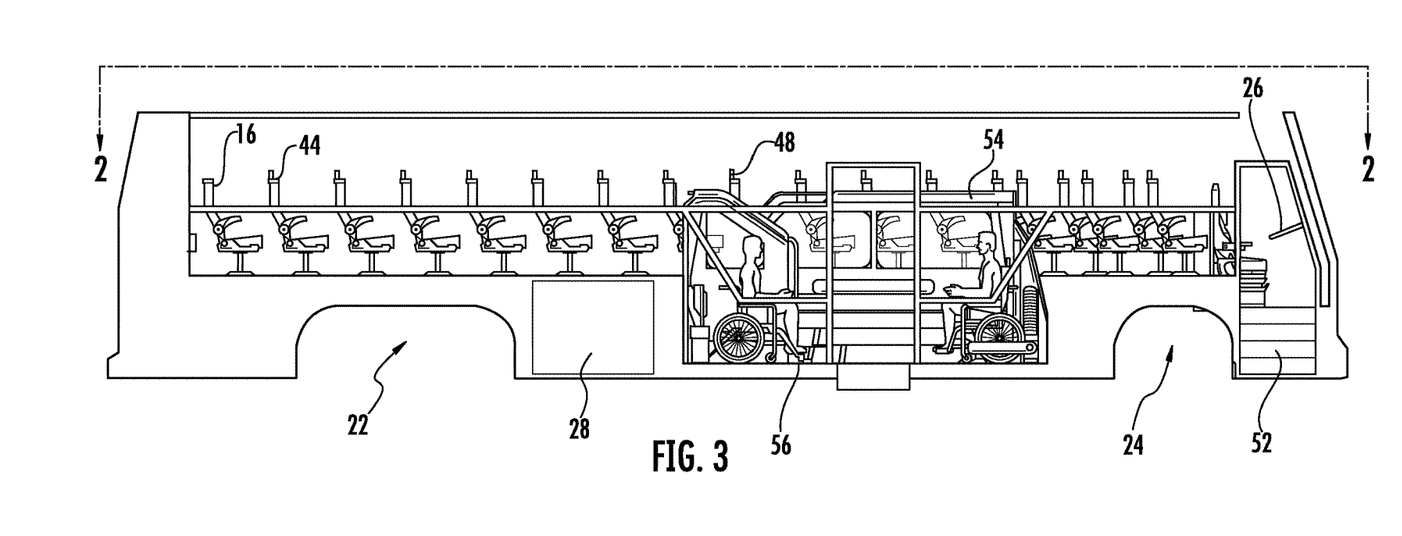
FIG. 3 is a side elevation view of the motor coach, as in FIGS. 1 and 2.

Returning to matters of more significance to the disclosure, and directing attention to all of FIGS. 1-3, but especially FIG. 2, the coach 10 further comprises a central aisle 30, represented by the longitudinal line 30, that extends from the front of the driver area 12 to the front of the rear seats 16. The aisle 30 includes a lateral offset region 32, composed of a laterally offset, longitudinally extending portion 34, and two skewed or jogged portions 36, 38, at either end of the portion 34. The remainders of the aisle are transversely centered portions 40, 42.

The seating can now be explained, and explained in terms of places along the aisle 30. The rear seats 16, as indicated by the aisle 30 preferably ending at their front, extend laterally across the full width of the seating area, and in the preferred embodiment shown, include five individual rear seats. Numerous pairs 44 of rearward seats extend forward from the rear seats 16 to adjacent the skewed aisle portion 36, and in the preferred embodiment shown, include 10-16 pairs 44 of seats, 5-8 pairs 44 on either side of the aisle portion 40. A privacy screen 46 exists forward of the rearward seat that is forward-most among such seats and also adjacent-most to the skewed aisle portion 36, best seen in FIG. 1. The screen 46 protects a passenger in the seat relative to other passengers moving in the aisle 30. Adjacent the screen 46, and forward of the rearward seat pairs 44, seats exist in rows of single seats or "singles" 48, as marked in FIG. 3, and in the preferred embodiment shown, include 5-7 singles. The singles 48 extend from the front-most of the rearward seat pairs 44 forward to forward seat pairs 50, to be described, but unlike the seat pairs 44, 50, extend along one side of the skewed portion 34 of the aisle 30, and that one side only. The forward seat pairs 50 then extend forward from the singles 48 in slightly longitudinally offset pairs to the front of the passenger area 14, on either side of the forward portion 42 of the aisle 30.

At the front, the forward portion 42 of the aisle opens to the driver area 12, and laterally opposite the driver area 12, to a front stairwell 52. See FIG. 3. The stairwell extends up and down from the bottom step and forward door, not shown, provided for mobile passengers up to and down from the raised level of the aisle 30, which as can be seen is indeed a raised aisle on a raised floor 55, see FIG. 4, a floor that extends under all the described seats and the driver area 12. The floor 55 is essentially flat. The stairwell may be a traditional or conventional strictly laterally extending stair, as shown, or be a curved stairwell, as in U.S. Pat. No. 5,651,579 issued to Motor Coach Industries Ltd. In 1997, incorporated in full by reference.

The width of the aisle 30 is substantially uniform throughout its longitudinal extent. Two trapezoidal areas are formed along the aisle 30 in the areas of the skewed or jogged portions 36, 38. These may be considered to include the aisle 30 and adjacent spaces on the floor.

Figure 4:
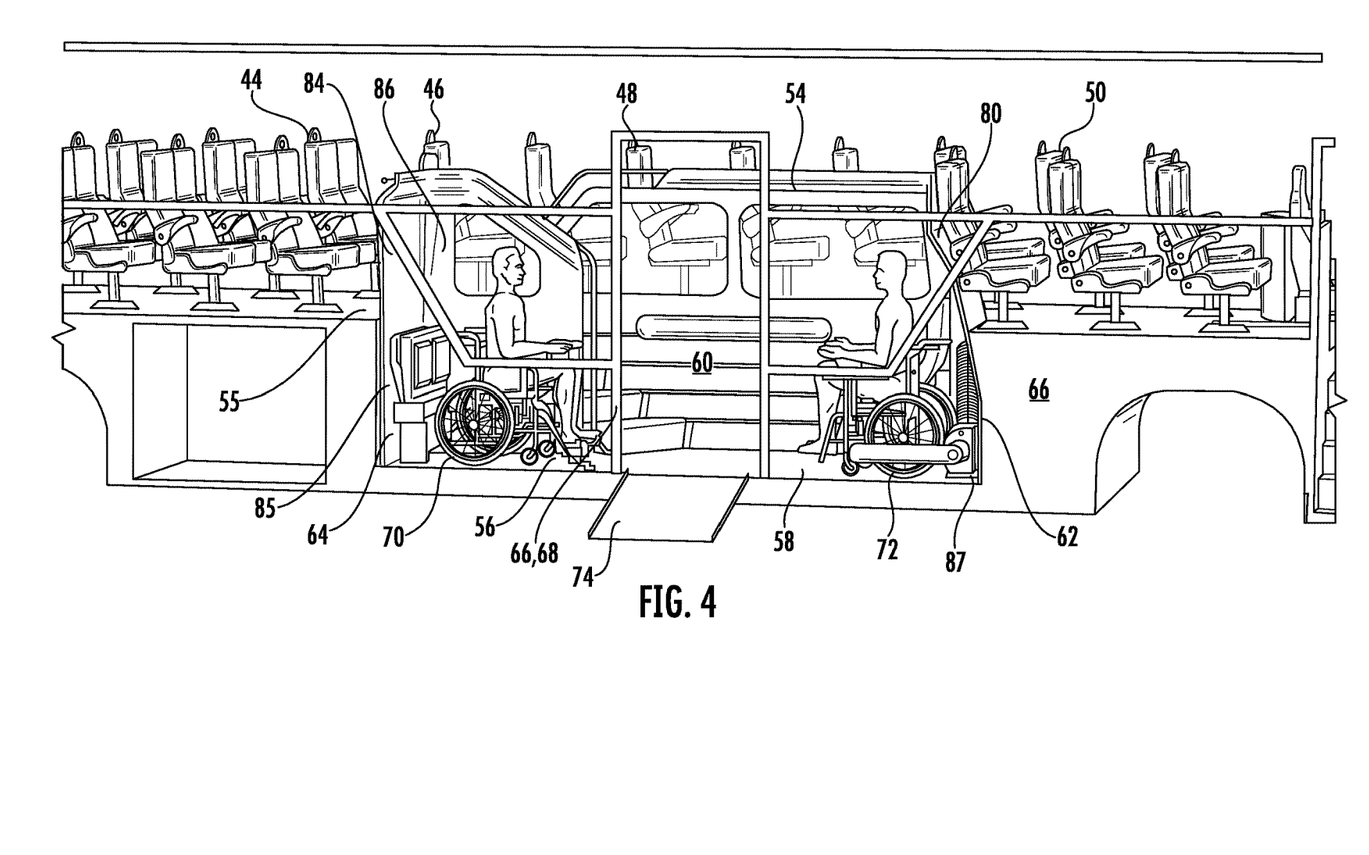
FIG. 4 is a perspective view of an embodiment of a mobility impaired area of the preferred motor coach, with an exterior sidewall and side door of the coach removed to show interior detail.
Figure 5:
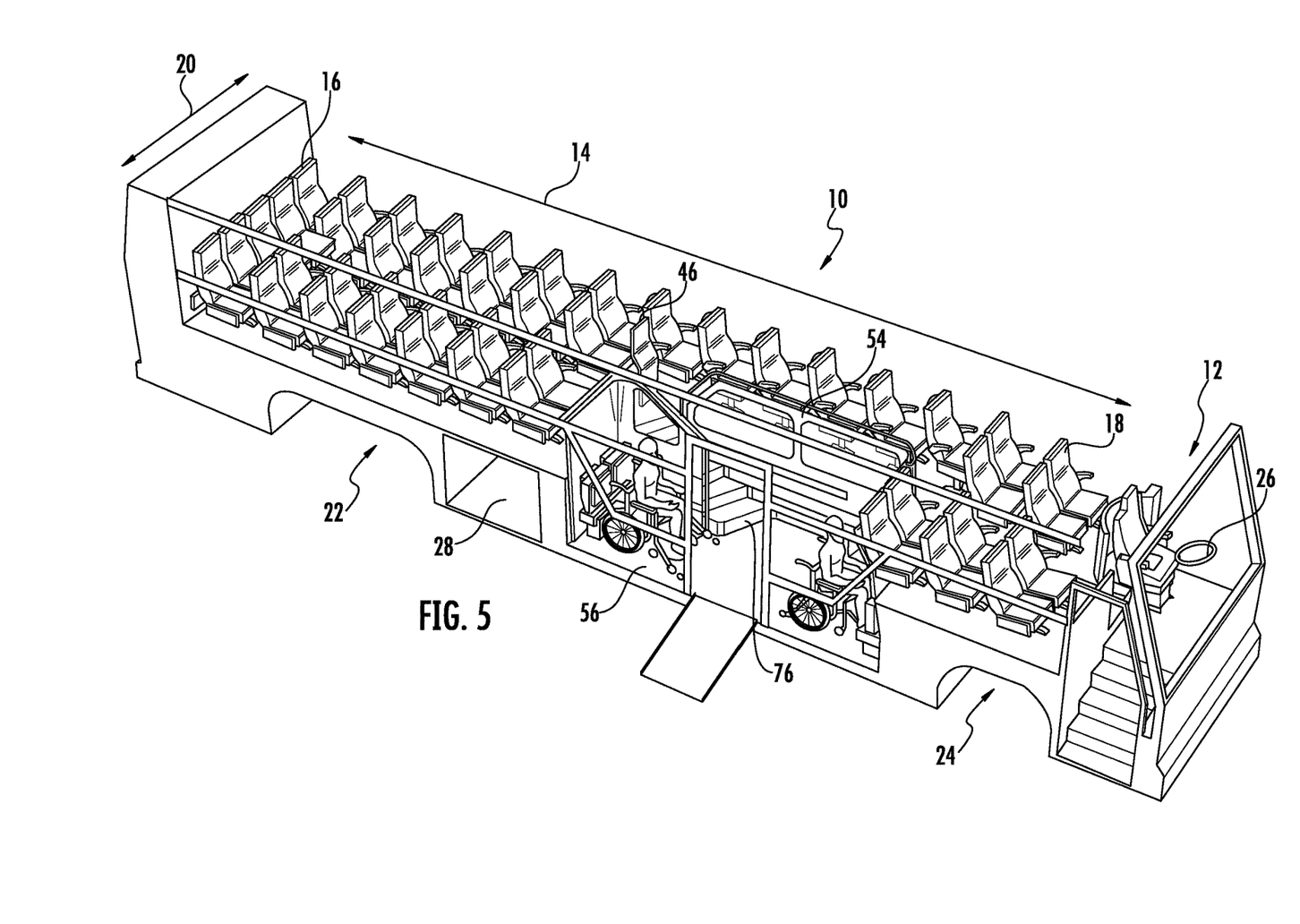
FIG. 5 is a perspective view of relevant portions of an embodiment of a motor coach of the disclosure, with the driver area of the coach to the right, the rear of the coach to the left, wheel well spaces along the lower portions of the coach body, and portions of the coach removed to show interior detail.
Figure 6:
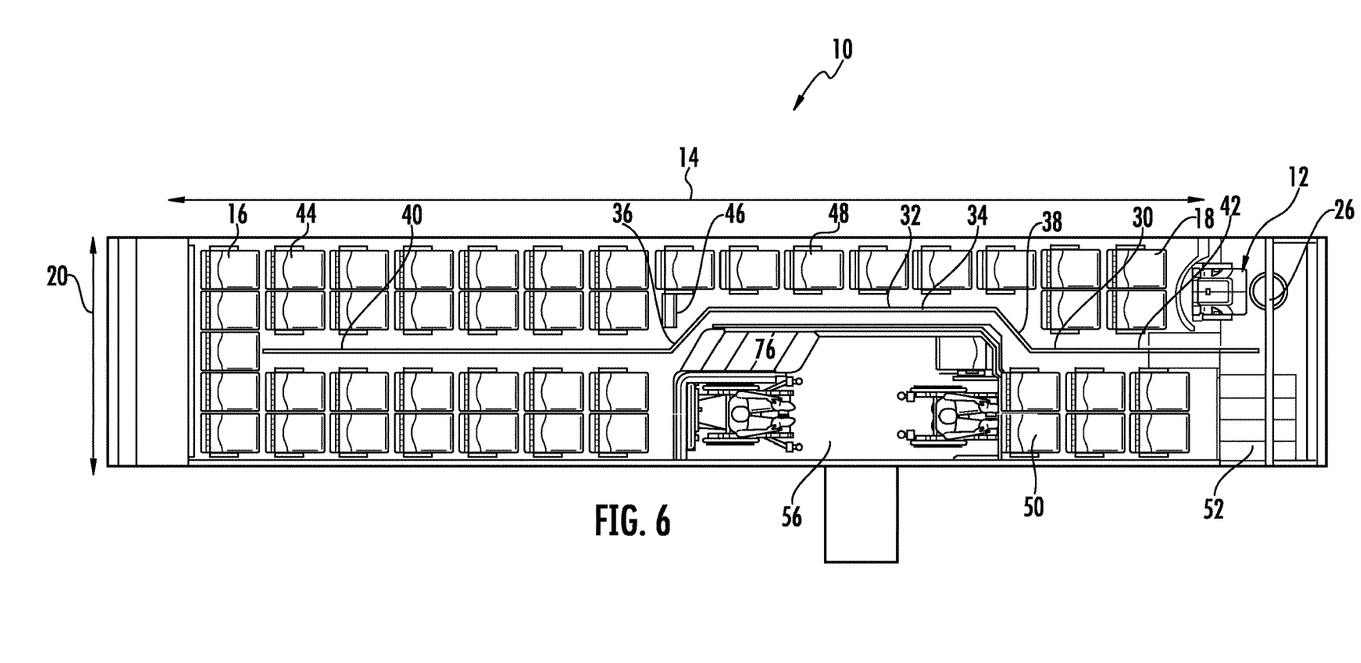
FIG. 6 is a top plan view of the preferred motor coach of this disclosure, again with the roof removed, taken along line 6-6 of FIG. 7.
Figure 7:
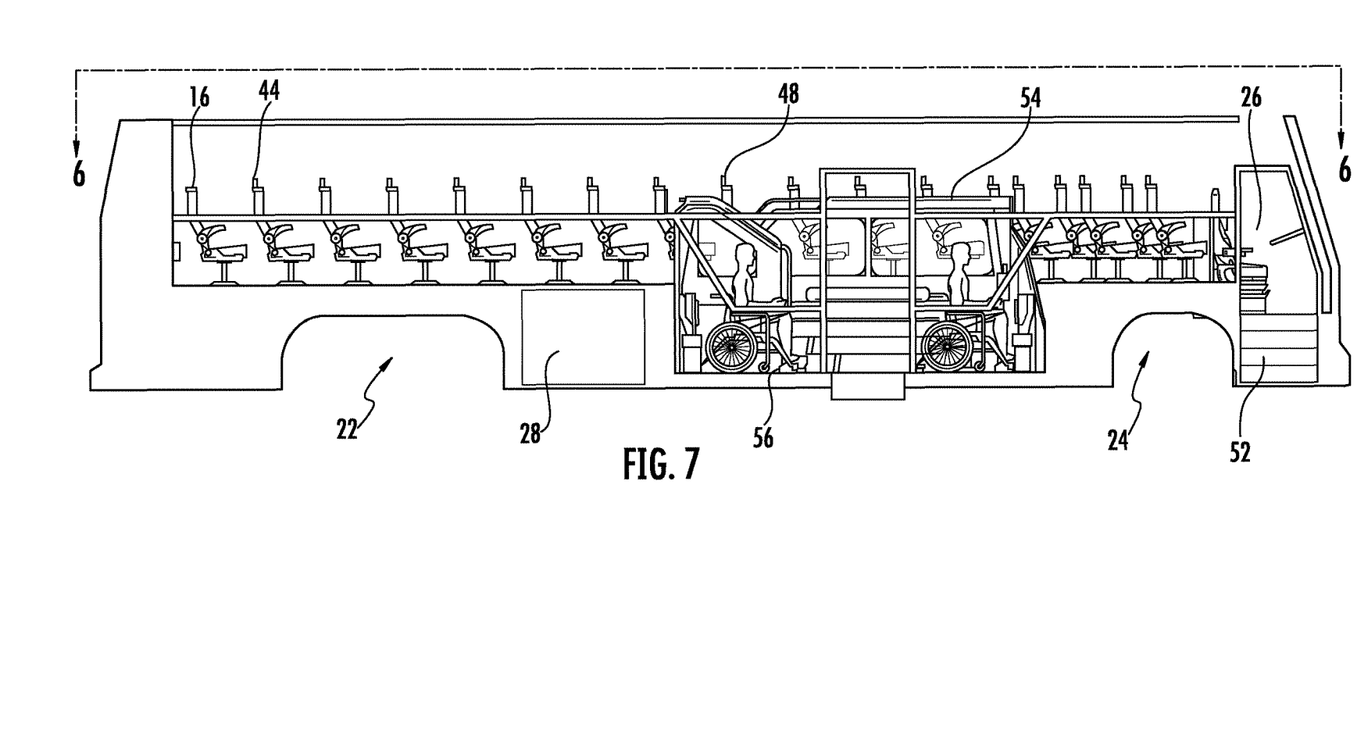
FIG. 7 is a side elevation view of the motor coach, as in FIGS. 5 and 6.
Figure 8:
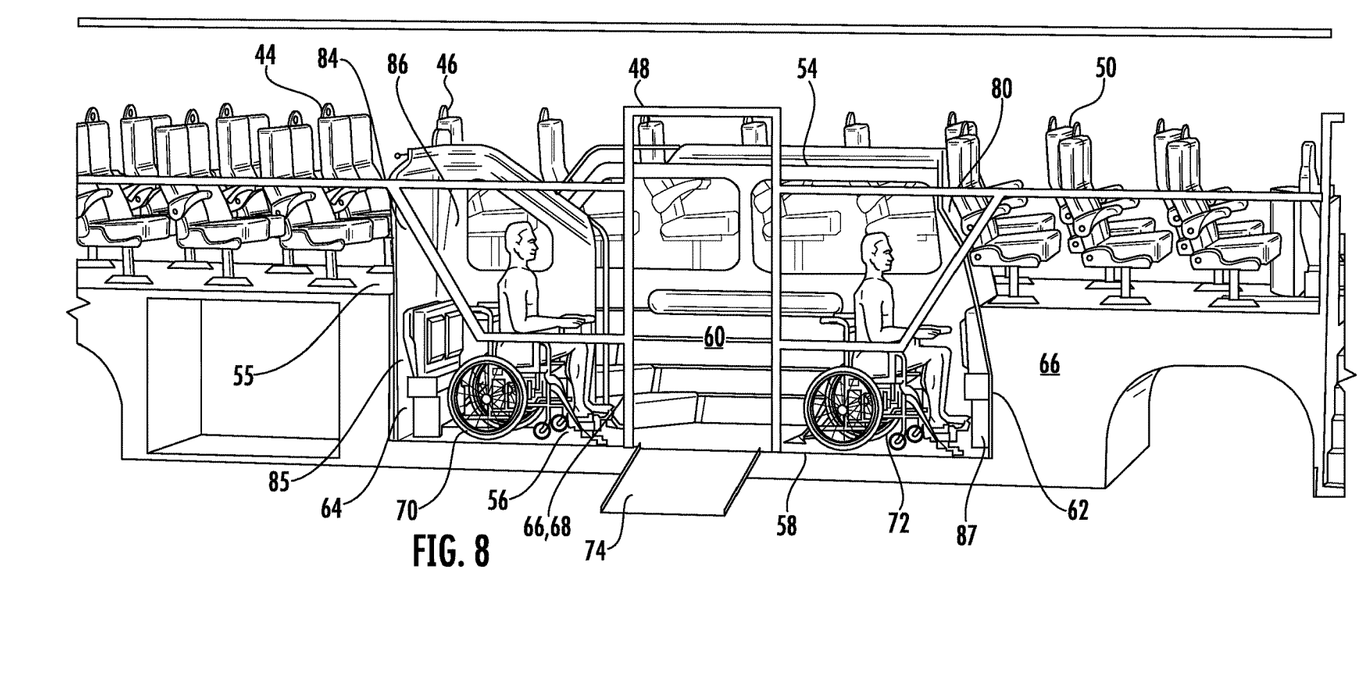
FIG. 8 is a perspective view of an embodiment of a mobility impaired area of the preferred motor coach, with an exterior sidewall and side door of the coach removed to show interior detail.

Laterally across the aisle from the singles 48, the coach 10 includes another internal, privacy, safety, and aisle-defining wall, in this case marked wall 54 in FIGS. 1, 3 and 4. The wall 54 is in the nature of a "pony" wall, a wall that extends upward from the floor, best considered to be the "upper floor," of the coach 10, but that does not extend upward to the roof of the coach. The term "pony" wall is known to be used for abbreviated or "half height" walls. As best seen in FIG. 4, the wall 54 may be formed of opaque, translucent or transparent material, and as preferred and shown in FIG. 4, is translucent, with a three-dimensional texture on its surface. Back to FIG. 2, the wall 54 provides a protective, more or less waist height barrier, that protects passengers as they walk the aisle portion 34 and its jogs 36, 38, due to structure to be explained, and also provides an upper viewing area that permits them to observe the coach passenger area front to back as they traverse the aisle 30.

Attention is now directed to a mobility impaired area 56, marked in all of FIGS. 1-4. The area 56 is bounded on one lateral side by the exterior of the coach, and bounded on the remaining three sides of the rectangular area by the interior of the coach. The floor 58 of the area 56, see FIG. 4, is closely adjacent the roadways under the coach 10. The floor 55 of the mobile passenger area is substantially vertically above the floor 58. The surface area of the mobility impaired area 56 in some embodiments may be less than about 25 percent of the surface area of the raised floor 55, or may be less than about 33 percent of the surface area of the raised floor 55. An inner longitudinal wall 60 of the mobility impaired area 56 rises from the area floor 58 to the height of the mobile passenger area floor 55. Forward and rearward transversely extending walls 62, 64 also extend from the mobility impaired area floor 58 to the raised mobile passenger floor 55, and from the inner surface of the exterior wall 66 of the coach 10 toward the longitudinal wall 60. Thus, in the forward-to-backward area of the singles 48 and the offset aisle portion 34, the mobility impaired area 56 occupies the remainder of the width of the coach 10. The width of the area 56 is such that wheelchairs, such as chairs 70, 72 in FIG. 4, may sit aligned toward the front or the back of the coach 10. The occupants of the chairs 70, 72, may thus face forward, or rearward, as desired. As shown in FIGS. 1-4, wheelchair 70 is shown forward facing while wheelchair 72 is shown rearward facing. In FIGS. 5-8, another embodiment of the motor coach, however, both wheelchairs 70 and 72 are shown forward facing.

Access to the area 56 is available in two ways. First, as in FIG. 4, a coach side doorway 66 is defined by a doorframe 68. The width of the doorframe 68 is adequate to accommodate wheelchairs, such as 70, 72. The height is also adequate for both the mobility impaired and the mobile of common heights. Because the coach lower componentry is elevated a typical short distance off the roadways, a ramp 74 is provided. As in FIG. 4, the ramp 74 is excellent for both the mobility impaired and those who may assist them. It is unlike the vertically lifting devices of patents such as U.S. Pat. No. 6,043,741 issued to Ricon Corporation in 2000. It need not have and as preferred does not have a scissoring mechanism to accomplish a substantial vertical lifting of an occupied wheelchair while the occupant sits idle, under the supervision of a driver or similar person deploying the lift. It does not lift to the raised upper floor 55. It also need not have and does not have as preferred a transversely extending and retracting platform, again on which an occupied wheelchair sits with an idle occupant, and which under action of the driver moves into the interior of the coach. Instead, with the short distance of the floor 56 to the road, the ramp 74 may take the form of a device that occupies the bottom of the doorframe 68 when it is stowed alongside the side 66 of the coach 10, and may pivot outwardly and downwardly to contact the roadway at its outer extremity. The ramp 74 presents a gently sloped short incline from the roadway to the floor 56, an incline that many if not all mobility impaired persons including wheelchair occupants can maneuver up and get themselves and their mobility aids into the coach 10 with no assistance, or at most minimal assistance. Mobility impaired occupants of the coach 10 including wheelchair occupants are thus able to enter the area 56 in short order, with dignity, under their own power or with minimal assistance, with uninterrupted possession of their mobility aids and personal effects, and in privacy relative to the movement of mobile passengers up the stairway 52.

The second manner of access to the mobility impaired area 56 is up and down a second internal stairway 76 of the coach 10. See FIGS. 1 and 2. The stairway 76 is well to the rear of the front stairway 52, and entirely within the confines of the coach 10, and without a door at either upper or lower end. It extends between the lower floor 58 and the upper floor 55. As most preferred, the stairway 76 is at the rearward end of the mobility area 56, between the longitudinal inner wall of the area 56 and the rearward wall 64. The stairway 76 occupies a corner between these walls. At the top of the stairway 76, the upper floor 55 has an edge at a diagonal to the longitudinal and transverse directions, which defines the top edge of the top step of the stairway, and a side edge of the trapezoidal floor area in the area of the aisle jog 36. The remaining steps of the stairway 76 have edges that follow the diagonal of the top step. All steps are thus most preferably on a diagonal, while the lateral width of the steps remains constant and they are longitudinally aligned with each other and the rear portion 40 of the aisle 30.

The benefit and purpose of the pony wall, wall 54, may now be seen, as it separates the aisle portion 34 from the mobility impaired area 56, because of the height difference between the floors 55, 58, and the presence of the vertical wall 60 along the aisle portion 34. The wall drops away on an angle toward the rear as the stairs of the stairwell 76 rise, presenting less height difference between each step and the upper floor 55. The wall 54 includes, however, an extension wall 80, as in FIG. 4, which extends from the wall 54 around to the front of the mobility area 56, providing a barrier and safety between the floor levels 55 and 58 along the more forward portions and front of the mobility area 56. The extension wall 80 may be shaped, as most preferred and shown in FIG. 4, to have an upper portion rearward of the wall 62 of the area 56, to accommodate the seat backs and reclining of the forward seat pair 50 that is directly forward of the extension wall 80, and to occupy a few inches of longitudinal space well above the floor 58 of the area 56. A similar but independent rear wall 84 completes the barrier and safety between the floor levels 55, 58. The rear wall 84 is above the mobility area wall 64, and is also in pony form. A stairwell defining longitudinal wall section 86 extends forward from the rear wall 84 alongside the stairwell 76 and defines a sloped upward edge at hand heights useful for mobile and even somewhat mobility impaired passengers and the driver using the stairwell 76.

As can be seen, especially in FIG. 4, the mobility area 56 is perfectly open to and is an integrated part of the passenger area, especially in that no walls separate the mobility area from the remainder of the passenger area above the walls 54, 80, 84. Air circulation occurs between the mobility impaired portion of the passenger area and the mobile portion of the passenger area. Windows and lighting are shared. Ambience is shared. Mobile passengers and the driver may interact easily with mobility impaired passengers, by simply getting their attention and speaking with them, from positions on the stairway 76, above the walls 54, 80, 84, and in the case of the driver, through the coach loudspeaker system. Attention may be provided between the mobility impaired and the mobile, if needed, as well, while the coach is moving. And when mobility impaired are loading on and unloading from the mobility impaired area 56, through the door 66, the non-mobility impaired may accompany them, as needed, and then seat themselves without exiting and reentering the coach 10 through the front door and stairway 52, by using the stairway 76. Non-mobility impaired, or companion/caregiver seating, is provided in area 56.

The mobility impaired area 56 is completed with securements for the wheelchairs, which may take the form of any one or more of the securements of the prior art identified above, such as straps with hooks on retracting reels, secured to the mobility impaired area floor 58. The area 56 is also completed with folding seats 85, 87, see FIG. 4, which rim the perimeter of the area 56. The mobility impaired area folding seats 85, 87 may be used when the mobility impaired are not present or expected. In some embodiments, additional folding seats (not shown) may be located along wall 60. They may also be occupied by close companions and aids of the mobility impaired when necessary. As described above, non-mobility impaired, or companion/caregiver seating, is provided in area 56.

A preferred embodiment, the invention, and features, aspects and advantages of the preferred embodiment and the invention, have now been described. Claims conclude this specification. The claims are not to be limited to details of the preferred embodiment except as stated to exist in the claims, and definitions of claim terms are not to be used as a subterfuge to limit the claims to details of the preferred embodiments by defining claim terms narrowly such that they incorporate details of the preferred embodiment.

CONCLUSION

The present invention is disclosed above and in the accompanying drawings with reference to a variety of examples. The purpose served by the disclosure, however, is to provide an example of the various features and concepts related to the invention, not to limit the scope of the invention. One skilled in the relevant art will recognize that numerous variations and modifications may be made to the aspects described above without departing from the scope of the present invention, as defined by the appended claims.

We claim:

1. A motor coach comprising:
a front entry,
an upper stairwell extending up from the front entry, the upper stairwell having a top and a bottom,
a raised floor generally at a level of the top of the upper stairwell, wherein the raised floor is substantially flat;
an upper aisleway extending rearward from the upper stairwell along the raised floor,
upper seats along the upper aisleway,
a side doorway positioned between a forward wheel well of the motor coach and a rearward wheel well of the motor coach, the side doorway providing an entrance to a mobility impaired area, the side doorway comprising a side doorframe, wherein the side doorframe has hag a bottom,
the mobility impaired area comprising a floor generally at a level of the bottom of the side doorframe, a longitudinal inner wall, a forward inner wall, and a rearward inner wall; wherein the forward inner wall and the rearward inner wall extend from an inner surface of an exterior wall of the motor coach toward the longitudinal inner wall, and wherein the longitudinal inner wall, the forward inner wall, and the rearward inner wall extend from the floor of the mobility impaired area to the raised floor; and
wherein the raised floor is at a height vertically above the floor of the mobility impaired area and extends transversely across a portion of a width of the motor coach from a driver side of the motor coach to the longitudinal inner wall of the mobility impaired area.

2. A motor coach as in claim 1 further comprising:
a rear stairwell between the mobility impaired area and the upper aisleway.

3. A motor coach as in claim 1 further comprising:
a ramp occupying the bottom of the side doorframe.

4. A motor coach as in claim 3, wherein the ramp is configured to pivot outwardly and downwardly from the bottom of the side doorframe.

5. A motor coach as in claim 4, wherein the ramp and the side doorframe have substantially the same width.

6. A motor coach as in claim 1 further comprising:
an offset to the upper aisleway alongside the mobility impaired area.

7. A motor coach as in claim 6, further comprising:
at least one row comprising a single seat along the offset.

8. A motor coach as in claim 1, wherein the a portion of the longitudinal inner wall is transparent.

9. A motor coach as in claim 1, wherein a portion of the longitudinal inner wall is translucent.

10. A motor coach as in claim 1, wherein the a portion of the longitudinal inner wall is opaque.

11. A motor coach comprising:
a front entry,
an upper stairwell extending from the front entry, the upper stairwell having a top and a bottom,
a raised floor extending rearward from the upper stairwell and generally at a level of the top of the upper stairwell,
a side doorway positioned between a forward wheel well of the motor coach and a rearward wheel well of the motor coach, the side doorway providing an entrance to a mobility impaired area, the side doorway comprising a side doorframe having a bottom, and
the mobility impaired area having a floor positioned generally at a level below the level of the raised floor a longitudinal inner wall, a forward inner wall, and a rearward inner wall; wherein the forward inner wall and the rearward inner wall extend from an inner surface of an exterior wall of the motor coach toward the longitudinal inner wall, and wherein the longitudinal inner wall, the forward inner wall, and the rearward inner wall extend from the floor of the mobility impaired area to the raised floor; and,
wherein a surface area of the mobility impaired area is less than about 33 percent of a surface area of the raised floor, and
wherein the raised floor extends transversely across a portion of a width of the motor coach from a driver side of the motor coach to the longitudinal inner wall of the mobility impaired area.

12. A motor coach as in claim 11, wherein the surface area of the mobility impaired area is less than about 25 percent of the surface area of the raised floor.

13. A motor coach as in claim 11 further comprising:
an upper aisleway extending longitudinally along the raised floor and substantially transversally centered on the motor coach.

14. A motor coach as in claim 13 further comprising:
upper seats along the upper aisleway.

15. A motor coach as in claim 14 further comprising:
an offset to the upper aisleway alongside the mobility impaired area.

16. A motor coach as in claim 15, further comprising:
at least one row comprising a single seat along the offset.

17. A motor coach as in claim 11 further comprising:
a rear stairwell extending between the mobility impaired area and the raised floor.

18. A motor coach as in claim 11 further comprising:
a ramp extending from the side doorframe.

19. A motor coach as in claim 18, wherein the ramp is configured to pivot outwardly and downwardly from the bottom of the side doorframe, and wherein the ramp and the side doorframe have substantially the same width.

20. A motor coach as in claim 11, further comprising:
at least one wheelchair securement device engaged with the mobility impaired area.

21. A motor coach as in claim 11, further comprising:
at least one folding seat in the mobility impaired area.

22. A motor coach comprising:
a front entry positioned forward of a forward wheel well;
an upper stairwell extending up from the front entry, the upper stairwell having a top and a bottom,
a raised floor generally at a level of the top of the upper stairwell, wherein the raised floor is substantially flat;
an upper aisleway extending rearward from the upper stairwell along the raised floor, the upper aisleway alongside a mobility impaired area;
a side doorway positioned between the forward wheel well of the motor coach and a rearward wheel well of the motor coach, the side doorway providing an entrance to the mobility impaired area, the side doorway comprising a side doorframe, wherein the side doorframe has a bottom,
the mobility impaired area comprising a floor generally at a level of the bottom of the side doorframe, a longitudinal inner wall, a forward inner wall, and a rearward inner wall; wherein the forward inner wall and the rearward inner wall extend from an inner surface of an exterior wall of the motor coach toward the longitudinal inner wall, and wherein the longitudinal inner wall, the forward inner wall, and the rearward inner wall extend from the floor of the mobility impaired area to the raised floor;
a rear stairwell extending between the mobility impaired area and the upper aisleway; and
upper seats positioned along the upper aisleway, the upper seats comprising:
 a plurality of rearward seat pairs positioned on either side of the upper aisleway rearward of the mobility impaired area;
 a plurality of forward seat pairs positioned on either side of the upper aisleway forward of the mobility impaired area; and
 a plurality of single seats positioned along an offset of the upper aisleway;
wherein the raised floor is at a height vertically above the floor of the mobility impaired area and extends transversely across a portion of a width of the motor coach from a driver side of the motor coach to the longitudinal inner wall of the mobility impaired area; and
wherein the mobility impaired area is positioned between the forward wheel well and the rearward wheel well.

\* \* \* \* \*